United States Patent [19]

Rosenthal et al.

[11] 3,873,674

[45] Mar. 25, 1975

[54] CONVERSION OF SULFUR DIOXIDE TO SULFUR TRIOXIDE BY PEROXYTITANIUM COMPLEXES

[75] Inventors: Rudolph Rosenthal, Broomall; Robert W. Rieve, Springfield; Joseph A. Kieras, Lincoln University; Giovanni A. Bonetti, Wynnewood, all of Pa.

[73] Assignee: Atlantic Richfield Company, Philadelphia, Pa.

[22] Filed: Aug. 20, 1973

[21] Appl. No.: 389,934

[52] U.S. Cl. ............ 423/244, 252/454, 260/618 C, 423/513, 423/522, 423/532, 423/538
[51] Int. Cl. ..................... C01b 15/08, C01b 17/60
[58] Field of Search .......... 423/244, 513, 533, 538, 423/544, 522, 531, 532, 242; 260/618 C; 252/454

[56] References Cited
UNITED STATES PATENTS

| | | | |
|---|---|---|---|
| 636,924 | 11/1899 | Schroeder | 423/538 |
| 1,893,812 | 1/1933 | Weil | 423/533 |
| 2,926,999 | 3/1960 | Tarbutton et al. | 423/242 |
| 3,410,903 | 11/1968 | Solomon | 260/618 C |
| 3,733,393 | 5/1973 | Couillaud et al. | 423/522 |
| 3,745,751 | 7/1973 | Zey et al. | 423/522 |
| 3,751,480 | 8/1973 | Brunie et al. | 260/618 C |
| 3,760,061 | 9/1973 | Hammond | 423/242 |

OTHER PUBLICATIONS

Mellor, J. W., A Comprehensive Treatise of Inorganic and Theoretical Chemistry, (1929) Vol. VII, Longmans Green & Co., p. 63–66.

*Primary Examiner*—Oscar R. Vertiz
*Assistant Examiner*—Gary P. Straub
*Attorney, Agent, or Firm*—Delbert E. McCaslin

[57] ABSTRACT

A supported peroxytitanium complex as an oxidizing agent in the form of a fixed bed is employed to convert sulfur dioxide containing gaseous streams, such as stack gases, to sulfur trioxide which can be recovered by solution in water to give sulfuric acid, and after the titanium complex has been reduced it can be conveniently regenerated with an organic hydroperoxide for reuse.

5 Claims, No Drawings

CONVERSION OF SULFUR DIOXIDE TO SULFUR TRIOXIDE BY PEROXYTITANIUM COMPLEXES

BACKGROUND OF THE INVENTION

This application is related to allow copending application Ser. No. 390,152, filed Aug. 20, 1973, in the name of Rosenthal, Kieras, and Bonetti, which is directed to the production of peroxytitanium complexes per se.

Stack gases from a great many industries including power generation using fossil fuels contain sulfur dioxide in quantities ranging from very dilute to rather high concentrations, but all of which present a major ecological problem. Various catalytic methods have been proposed for converting sulfur dioxide in stack gases to sulfur trioxide, but these have not been completely satisfactory for a variety of reasons ranging from poor conversion to inability to convert highly dilute streams.

The present invention provides a method which is applicable to streams containing only a few ppm of sulfur dioxide to those containing 100 percent sulfur dioxide. Moreover the conversion is substantially complete to sulfur trioxide which can be removed by solution in water to produce sulfuric acid.

Previously proposed catalytic methods also frequently presented an additional problem in that eventually the catalyst became spent or poisoned and required complex regeneration or even replacement. The instant process provides an oxidizing agent which can be regenerated readily to its original activity and reused, with such cycles being indefinitely repetitious.

SUMMARY OF THE INVENTION

The instant process involves producing the peroxytitanium complex on an inert support such as silica or alumina and using this in the form of a bed over which the sulfur dioxide-containing stream is passed. The sulfur dioxide is converted to sulfur trioxide and can be removed by solution in water to form sulfuric acid while the titanium complex is eventually reduced to the titanium sulfate which is then reconverted to the peroxy complex. P. Faber in Zeitschrift Analyt. Chem., Vol 46, p. 277 (1907) reports that a peroxytitanium complex can oxidize sulfur dioxide but gives no details or further information in the paper. Nothing is shown using an oxidizing agent supported in a fixed bed in a gas phase system, or regeneration of the oxidizing agent.

It is an object of this invention therefore, to provide a method for the oxidation of sulfur dioxide contained in gaseous streams to sulfur trioxide.

It is another object of this invention to provide a method for converting sulfur dioxide in a gaseous stream to sulfur trioxide using a fixed bed of an oxidizing agent.

It is another object of this invention to provide a method for the conversion of gaseous sulfur dioxide to sulfur trioxide using a peroxytitanium complex on an inert support in the form of a fixed bed.

It is another object of this invention to provide a cyclic method for the conversion of gaseous sulfur dioxide to gaseous sulfur trioxide employing a supported peroxytitanium complex which after becoming reduced to the titanium sulfate is reoxidized to the complex and reused.

Other objects of this invention will be apparent from the detailed description of the invention and from the claims which follow.

DESCRIPTION OF THE INVENTION

The sulfur dioxide-containing gaseous streams which can be treated by the method of this invention can vary from a few parts per million of sulfur dioxide to pure or 100 percent sulfur dioxide.

The reaction is stoichiometric, i.e., one peroxy oxygen atom of the complex reacts with one molecule of the sulfur dioxide to produce the sulfur trioxide so that the higher the concentration of sulfur dioxide the faster the complex will be reduced or the greater the amount of complex required to accomplish the conversion for any given volume of the sulfur dioxide-containing stream. The sulfur dioxide can be contained in any gaseous stream but most generally industrial stack gases such as those of the iron and steel industries, ore smelting and roasting industries, the petroleum industry, power generating stations employing fossil fuels, waste incinerators and the like are most amenable to the method of this invention.

Heretofore when these gases were the source of sulfur dioxide for the so-called contact process substantially all impurities such as arsenic and other metals and particulate matter had to be removed in order to avoid poisoning the catalyst. Likewise high temperatures were required. The method of the instant invention, however, employs an oxidizing agent which is substantially unaffected by any impurities in the sulfur dioxide containing stream.

The process is operable at temperatures ranging from 0° to 100° C. and preferably from ambient temperatures (20°) to 80° C. Thus the heat contained in the stack gases, for example, can be recovered by conventional engineering such as indirect heat exchange and the like for use in the particular process involved. The cooled gases, if they contain considerable amounts of particulate matter which might eventually plug the bed of supported peroxytitanium oxidizing agent can be cleaned by any of the conventional well known processes such as scrubbing, electrostatic precipitation, bag filtration and the like before being passed over the bed. Since the bed is in general less densely packed than in the catalytic contact process considerably more particulate matter can be tolerated, however, since frequently this material is also ecologically objectionable it can be removed by any conventional means as described.

After the sulfur dioxide-containing gas stream has contacted the bed of the peroxytitanium complex and the sulfur dioxide has been converted to the trioxide, the trioxide can be removed by conventional scrubbing towers well known to the art with recovery of the sulfur trioxide as sulfuric acid.

The peroxytitanium complex for use in the method of this invention is preferably prepared by reacting titanium sulfate, $TiOSO_4 \cdot H_2SO_4 \cdot 8H_2O$ with an organic hydroperoxide at a pH of less than 1.5 and preferably less than 0.8 to 1. Highly acidic conditions are particularly preferred, i.e., in a pH range of from 0 to 0.4 to 0.6. Under these conditions the complexes produced are reddish in color and are further characterized by containing one titanium atom for each active oxygen atom. The above-described titanium sulfate is also sometimes written as $Ti(SO_4)_2 \cdot 9H_2O$, but irrespective of the molecular formula the titanium is in the (IV) valence state. The organic hydroperoxide is reduced in the preparation reaction to its corresponding alcohol. Likewise in the regeneration reaction the hydroperoxide is reduced to its alcohol. Hydrogen peroxide also could be used instead of the organic hydroperoxide either for producing or regenerating the complex but this reagent is so expensive and difficult to handle it would render the process economically unfeasible.

As shown in the literature other titanium compounds can be converted to the sulfate, for example the titanium oxide can be reacted with sulfuric acid to produce the sulfate, but since the sulfate is readily available commercially it is preferred as the source of the titanium (IV) ion.

The organic hydroperoxides preferred are those having the general formula ROOH wherein R is an alkyl, aralkyl or cycloalkyl radical. Such radicals may also be substituted with other non-reactive groups such as the halogens, nitro groups and the like. Those hydroperoxides having from 4 to 12 carbon atoms are preferred, in particular, tertiary butyl hydroperoxide, tertiary amyl hydroperoxide, ethylbenzene hydroperoxide, cyclohexyl hydroperoxide and cumene hydroperoxide. Other hydroperoxides such as 1,2,3,4-tetrahydronapthalene hydroperoxide and diisopropyl ketone hydroperoxide also can be used but are less preferred. In general those hydroperoxides most readily available commercially and whose corresponding alcohols (produced by the reduction of the hydroperoxide) are commercially useful either as such or when dehydrated to a polymerizable monomer are preferred sinced this lowers the overall cost of the process.

The hydroperoxide can be pure or it can be in the form of a crude oxidate as obtained by the thermal oxidation of the corresponding hydrocarbon using molecular oxygen in the absence of catalysts, most generally. Likewise oxidates which have been concentrated by removal of unreacted hydrocarbon and a portion of preponderance of the other oxygenated products can be used.

The preparation of the peroxytitanium complex can be carried out at temperatures in the range between the freezing point (0°C.) and boiling point (100°C.) of water, but preferably temperatures below about 85°C. are employed since some decomposition of the peroxytitanium complex tends to occur above this temperature. The most preferred temperature is in the range of from about 20° to 80° C. Atmospheric pressure is suitable although sub-atmospheric or super-atmospheric pressure can be used during the preparation but is of no particular advantage. The complex is prepared on any inert support such as silica gel, alumina, silica stabilized alumina, kieselguhr or the like, since the support does not enter into the reaction. Macrosized particles are preferred, i.e., pellets, beads, lumps or the like, as opposed to microsized particles such as finely divided powder. This permits ready flow of the gaseous stream through the bed.

The following Examples are provided for the purpose of showing the method of producing the supported peroxytitanium complex.

EXAMPLE I

A slurry of 75 g of commercial silica gel having a particle size of approximately 3 to 8 mesh, U.S. Sieve, 10 g titanium sulfate and 50 g of water was evaporated to dryness on a hot plate with continuous stirring and was then dried in an oven at 110° C. for 2 hours. To 50 g of the dried material was added 52.7 g of 94 weight per cent purity tertiary butyl hydroperoxide with cooling. After standing overnight at ambient temperature, the product was extracted 6 times with 100 ml portions of isopentane and then air dried. A product consisting of the red peroxytitanium complex on the silica gel particles was obtained.

EXAMPLE II

A run was carried out in the same manner as that in Example I except that commercial activated alumina was substituted for the silica gel. A product consisting of the red peroxy-titanium complex on the alumina was obtained.

In order to demonstrate the instant invention in additional detail the following runs were carried out.

EXAMPLE III

The supported red peroxytitanium on silica gel of Example I was employed. A 10 g portion of this supported complex was charged to a reactor in the form of an elongated bed and a 5 volume percent sulfur dioxide in nitrogen gas stream was passed through the bed at ambient temperature, i.e., about 20° C. The effluent gas was passed through a solution of barium chloride and a precipitate of barium sulfate was obtained, thus deomonstrating the oxidation of the sulfur dioxide to the sulfur trioxide which in turn was converted to sulfuric acid in the aqueous solution and precipitated as the barium sulfate salt. The red color of the peroxytitanium complex disappeared during the course of the reaction giving the white titanium sulfate on the silica gel support. When this color change was essentially completed the solid bed was purged with nitrogen and tertiary butyl hydroperoxide added (92–94 weight percent purity) again at ambient temperature. The red peroxytitanium complex was obtained and after wasing with n-hexane and dried, additional sulfur dioxide in nitrogen gas was passed through the bed. The same result was obtained, namely, that the sulfur dioxide was again oxidized to sulfur trioxide and the red peroxytitanium complex was reduced to the white titanium sulfate. The bed was again regenerated with tertiary butyl hydroperoxide and after washing and drying the cycle was repeated. After 3 such complete cycles no discernible deactivation of the supported complex could be observed showing that the process of this invention provides a good cyclic method for removal of sulfur dioxide from a gas stream by oxidation to sulfur trioxide.

The quantity of supported peroxytitanium complex employed will be dependent upon the concentration, i.e., the amount of sulfur dioxide in the gas stream being passed thereover. The amount of supported complex should be sufficient that there will be a reasonable time between regenerations, and since the reaction is stoichiometric if the concentration of sulfur dioxide is known and the amount of peroxytitanium complex is known it is simple calculation to determine when regeneration is required from the rate at which the gas is passed over the bed of the complex. It is preferred of course, to provide a reasonable safety factor so that regeneration is carried out prior to all of the complex being reduced, since otherwise it might result in allowing some sulfur dioxide to pass through the bed unconverted. In general, the margin of safety should be from about 5 to 20 percent of the peroxytitanium complex being unreacted when the passage of the sulfurdioxide-containing stream is stopped, or in other words when from 80 to 95 percent of the complex has been reduced to the titanium sulfate the passage of the gas is stopped and the complex is regenerated.

In continuous operation, parallel beds could be provided whereby one or more beds would be in operation in the reaction stage while the other beds would be in the regeneration stage, thereby providing continuous operation in accordance with ordinary engineering practice.

In the Example ambient temperatures were employed both for the reaction and regeneration, however, elevated temperatures up to 100° C. but preferably not above 80° C. could be employed for each step as has been noted.

Likewise tertiary butyl hydroperoxide was utilized both in making and regenerating the complex, but the same or different organic hydroperoxides could be employed. Tertiary butyl hydroperoxide is available in large quantities commercially and when reduced either in producing or regenerating the complex gives tertiary butyl alcohol. This alcohol is useful as a gasoline additive being a nonpolluting octane improving agent or when dehydrated gives isobutylene, a useful monomer.

We claim:

1. A cyclic process for the removal of sulfur dioxide from sulfur dioxide-containing gaseous streams which comprises passing said stream through a bed of a peroxytitanium complex having one peroxy oxygen group per titanium atom supported on an inert support and produced by mixing titanium sulfate in the form of a slurry with said inert support, drying on said support and thereafter reacting with an organic hydroperoxide, extracting with a hydrocarbon solvent and drying, thereby converting said sulfur dioxide to sulfur trioxide and reducing said complex to titanium sulfate removing said sulfur trioxide from the effluent stream of said bed, stopping said flow of gas through said bed, regenerating said peroxytitanium complex by contacting said titanium sulfate with an organic hydroperoxide, extracting with a hydrocarbon solvent, drying and thereafter resuming the passage of said sulfur dioxide-containing gas through said bed of said complex.

2. The method according to claim 1 wherein said sulfur dioxide-containing stream is passed through said bed at a temperature of from 0° to 100° C. and said contacting of said titanium sulfate with said organic hydroperoxide is carried out at a temperature in the range of from 0° to 100° C.

3. The method according to claim 2 wherein said temperatures are in the range of from 20° to 80° C.

4. The method according to claim 1 wherein said peroxytitanium complex is supported on either silica gel or alumina.

5. The method according to claim 4 wherein said organic hydroperoxide is said tertiary butyl hydroperoxide.

* * * * *